(12) United States Patent
Cornu

(10) Patent No.: US 9,429,106 B2
(45) Date of Patent: Aug. 30, 2016

(54) COMBUSTION CHAMBER COMPRISING A CONDENSATION-PROOF BARRIER ON A REGENERATIVE CIRCUIT

(75) Inventor: Daniel Cornu, Mantes la Jolie (FR)

(73) Assignee: SNECMA, Paris (FR)

( * ) Notice: Subject to any disclaimer, the term of this patent is extended or adjusted under 35 U.S.C. 154(b) by 1165 days.

(21) Appl. No.: 13/381,431

(22) PCT Filed: Jul. 8, 2010

(86) PCT No.: PCT/FR2010/051445
§ 371 (c)(1),
(2), (4) Date: Dec. 29, 2011

(87) PCT Pub. No.: WO2011/004127
PCT Pub. Date: Mar. 13, 2011

(65) Prior Publication Data
US 2012/0090292 A1  Apr. 19, 2012

(30) Foreign Application Priority Data

Jul. 9, 2009 (FR) ..................... 09 54765

(51) Int. Cl.
*F02K 9/97* (2006.01)
*F02K 9/64* (2006.01)

(52) U.S. Cl.
CPC . *F02K 9/97* (2013.01); *F02K 9/64* (2013.01); *F02K 9/974* (2013.01); *F05D 2260/231* (2013.01); *F05D 2300/2118* (2013.01)

(58) Field of Classification Search
CPC .............. F02K 9/64; F02K 9/34; F02K 9/40; F02K 9/97; F02K 9/972; F02K 9/974; F02K 1/04; F02K 1/10; F02K 1/40; F02K 1/82; F02K 1/822

USPC ....... 60/770, 257, 266, 267, 730; 239/127.1, 239/127.3, 265.11, 265.15, 265.43
See application file for complete search history.

(56) References Cited

U.S. PATENT DOCUMENTS 3,212,257 A * 10/1965 Frey et al. ...................... 60/770
3,230,613 A *  1/1966 Rechin et al. ............. 29/890.01
3,253,403 A *  5/1966 Hayes ....................... 239/265.15
3,460,759 A *  8/1969 Gregory et al. ........... 239/127.1
(Continued)

FOREIGN PATENT DOCUMENTS

EP  0 943 795  9/1999
EP  1 022 456  7/2000
(Continued)

OTHER PUBLICATIONS

Wikipedia—Rocket Engine Nozzle, pp. 1-2, Mar. 2008.*

*Primary Examiner* — William H Rodriguez
(74) *Attorney, Agent, or Firm* — Bookoff McAndrews, PLLC

(57) ABSTRACT

The invention concerns a combustion chamber (10) comprising a neck (15) downstream of the injection (11) of gases, and downstream of this neck a divergent section (20) whereof the outer face of the wall (30), when in operation, is cooled by a cooling system using a cryogenic product and surrounding this outer face. This divergent section (20), on the inner face (32) of its wall (30), comprises a coating (40) acting as temperature compensator so that the temperature of the inner face (42) of the coating (40) is higher than the condensation temperature of the combustion gases on this inner face (42) under operating conditions, such that no condensation is formed on this inner face (42).

13 Claims, 2 Drawing Sheets

(56) References Cited

U.S. PATENT DOCUMENTS

| | | | |
|---|---|---|---|
| 3,776,466 A * | 12/1973 | Ray | 239/265.15 |
| 4,272,956 A * | 6/1981 | Lamere et al. | 60/242 |
| 4,358,046 A * | 11/1982 | Detz et al. | 228/176 |
| 4,703,620 A * | 11/1987 | Niino et al. | 60/260 |
| 4,841,723 A * | 6/1989 | Lau et al. | 60/204 |
| 4,885,216 A * | 12/1989 | Naik | C22C 19/056 148/404 |
| 5,501,011 A * | 3/1996 | Pellet | 29/890.01 |
| 5,765,360 A * | 6/1998 | Schmidt et al. | 60/204 |
| 5,894,723 A * | 4/1999 | Gastal | 60/770 |
| 6,164,060 A | 12/2000 | Myers et al. | |
| 6,209,199 B1 * | 4/2001 | Cornu et al. | 29/890.01 |
| 6,442,931 B1 * | 9/2002 | Vasin et al. | 60/257 |
| 2002/0092291 A1 * | 7/2002 | Bichler et al. | 60/257 |
| 2007/0224443 A1 * | 9/2007 | Torigoe | C23C 4/085 428/632 |
| 2009/0133405 A1 | 5/2009 | Hawkins et al. | |

FOREIGN PATENT DOCUMENTS

| | | | |
|---|---|---|---|
| JP | 06-167245 | 6/1994 | |
| JP | 06167245 | * 6/1994 | F02K 9/62 |

* cited by examiner

COMBUSTION CHAMBER COMPRISING A CONDENSATION-PROOF BARRIER ON A REGENERATIVE CIRCUIT

TECHNICAL FIELD

The present invention concerns the field of combustion chambers including a divergent section.

In the following description, the terms "upstream" and "downstream" are defined in relation to the normal direction of circulation of the fluids in the combustion chamber along the walls of said chamber. The terms "inner" and "outer" indicate the region situated (or oriented toward) the inside and outside of the combustion chamber, respectively.

The invention more particularly concerns a combustion chamber including, downstream of the injection of the gases, a neck, and downstream of said neck, a divergent section whereof the outer face of the wall is, during operation, cooled by a cooling system surrounding said outer face.

BACKGROUND

Considered in particular is a rocket engine combustion chamber extending in a longitudinal direction defined by its axis of symmetry, the combustion chamber therefore being substantially rotationally symmetrical. The axis of symmetry is therefore contained in the combustion chamber, unlike cases of annular combustion chambers. In such combustion chambers, the propellants (fuel and oxidizer fluid, for example liquid hydrogen and liquid oxygen) are injected at one end 11 of the chamber 10 by injectors. FIG. 1 shows such a combustion chamber 10. The combustion reaction of the propellants produces combustion gases (for example water vapor) that are expelled by a neck 15 situated opposite the injectors. Downstream of the neck 15 (location of the combustion chamber with the smallest section), the chamber flares by a divergent section 20, which makes it possible to increase the speed of the combustion gases expelled through the neck 15, and therefore the thrust delivered by the engine. This divergent section 20 of the chamber 10 extends downstream via a divergent section 80 of the rocket engine. This divergent section 80 is fixed to the downstream end 25 of the divergent section 20 of the chamber 10, and is a separate part of the rocket engine from the combustion chamber 10.

The walls of the combustion chamber 10 are typically made from copper or a copper alloy, which offers the best compromise between thermomechanical resistance and thermal conductivity. During the operation of the rocket engine, these walls, including the wall 30 of the divergent section 20, are brought to very high temperatures (the combustion gases can be at a temperature in the vicinity of 3500 K upstream of the neck in the case of oxygen and hydrogen combustion) and must be cooled (their temperature at the neck must not exceed 1000 K) in order to keep their mechanical properties. The most common method for performing this cooling consists of circulating one of the propellants in or in contact with the wall 30 of the divergent section 20 of the chamber 10 because these propellants are at a very low temperature.

In fact, the propellants currently used are liquefied gases (to minimize their volume), and are therefore at a very low temperature when they are injected into the combustion chamber 10. As a result, these propellants circulating (before their injection) around the wall 30 of the divergent section 20 are at a temperature (20 K to 100 K) that is much lower than the ambient temperature. Ambient temperature refers to a temperature of about 300 K.

This propellant circulation makes it possible to cool the wall 30 such that, during operation of the engine, the temperature of the inner face 32 of the wall 30 is lower than the condensation temperature of the combustion gases escaping through the divergent section 20. For example, the temperature of the inner face 32 is less than 400 K, for example less than 300 K. As a result, the combustion gases (water vapor in the case of an oxygen-hydrogen combustion) circulating in the divergent section 20 along the wall 30 condense on the inner face 32 of said wall 30, which is undesirable.

Indeed, this condensation causes streaming along this inner face 32, which disrupts the flow of the combustion gases. Moreover, this condensation locally causes variations in the temperature of the inner face 32, which locally generates important stresses that can lead to a decrease in the lifetime of the chamber. It is therefore necessary to increase the temperature of the inner face 32 of said wall 30 in order to eliminate that condensation.

One solution considered to increase the temperature of said inner face 32 consists of increasing its roughness so as to increase the exchange surface of said inner face 32 with the combustion gases (water vapor in the case of an oxygen-hydrogen combustion) of the inside of the chamber. However, this solution is difficult to carry out because said roughness must be very fine for the exchange surface to be increased enough. Furthermore, modeling heat exchanges is very complex in the case of such a rough surface.

BRIEF SUMMARY

The invention aims to propose a combustion chamber whereof the divergent section has an inner face on which condensation substantially does not form during operation of the engine, and that is easy to produce.

This aim is achieved owing to the fact that this divergent section includes, on the inner face of its wall, a coating acting as a temperature compensator so that the temperature of the inner face of this coating is higher than the condensation temperature of the combustion gases on said inner face under the operating conditions, such that condensation does not form on said inner face.

Owing to these arrangements, little or no condensation forms on the inner face of the divergent section of the combustion chamber during operation of the engine. The solution according to the invention is easier to carry out than the existing or considered solutions because it is not necessary to increase the roughness of the inner face of the coating. Furthermore, the thickness and nature of the coating can be chosen according to the operating conditions of the divergent section. The solution according to the invention is therefore versatile.

Advantageously, the thickness of the coating increases gradually in the downstream direction from a null value downstream of the neck.

Thus, for example, the thickness of the coating increases gradually from a null value immediately downstream of the neck to a maximum value toward the downstream end of the divergent section of the chamber. The inventor has shown through tests that such a distribution of the thickness of the coating made it possible to reach, on the inner face of the coating, a substantially constant temperature along said face in the longitudinal direction. Indeed, the gradual increase of the coating thickness (i.e. without sudden increase of this thickness forming a step) prevents the circulation of the combustion gases (water vapor in the case of an oxygen-hydrogen combustion) in the chamber from being disrupted, and prevents the creation of a local temperature gradient. Such a configuration for the coating is therefore optimal and is the closest to the desired aim.

BRIEF DESCRIPTION OF DRAWINGS

The invention will be well understood and its advantages will better appear upon reading the following detailed description of an embodiment illustrated as a non-limiting example. The description refers to the appended drawings, in which.

DETAILED DESCRIPTION

Figure 1:
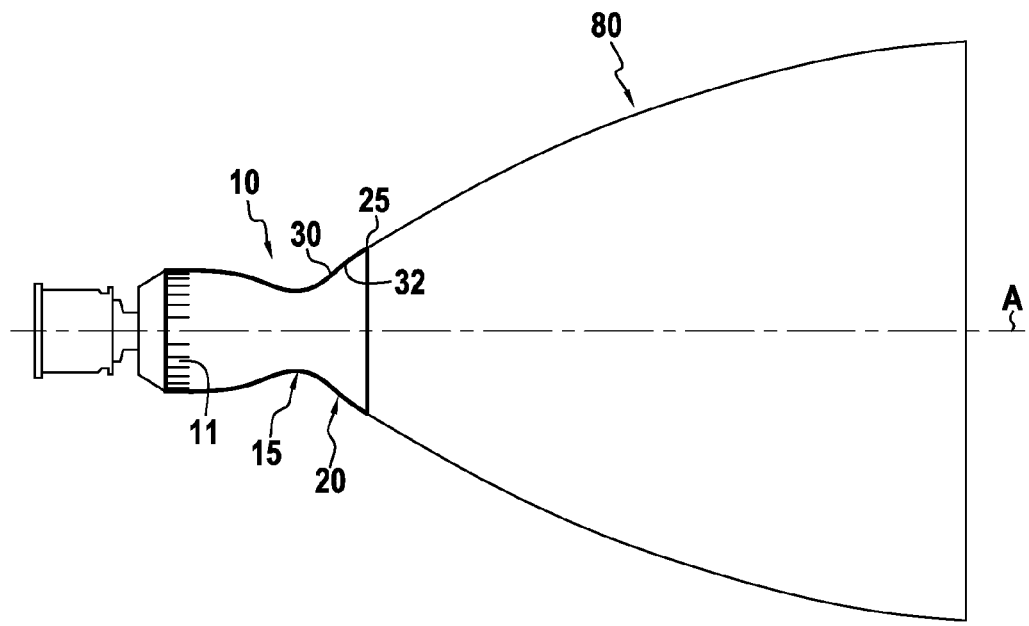
FIG. 1, already described, is an overall longitudinal cross-sectional view of a rocket engine.
Figure 2:
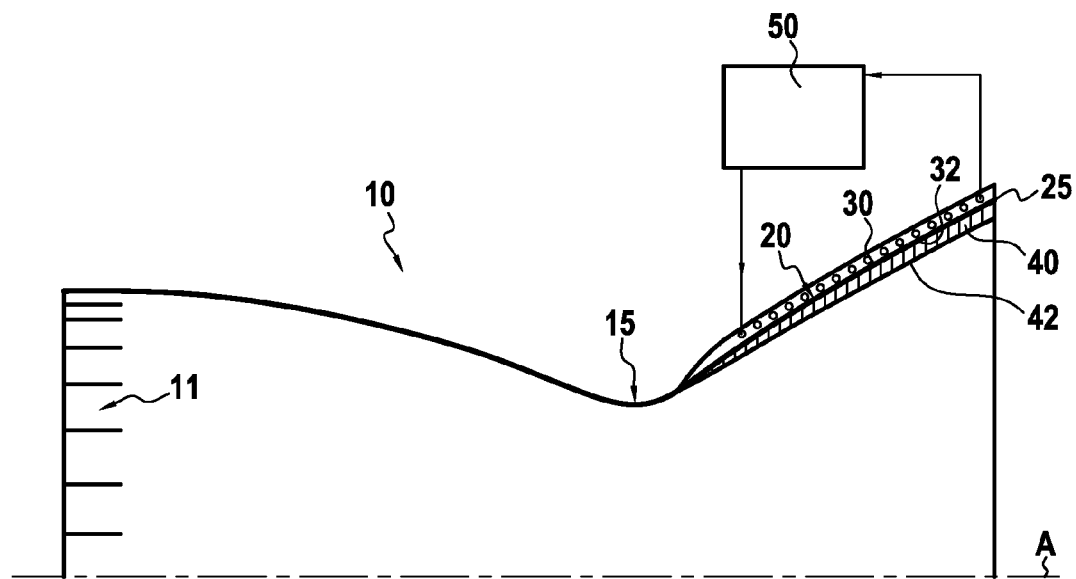
FIGS. 2 and 3 are longitudinal cross-sectional views of examples of combustion chambers, according to the invention.

FIG. 2 shows a longitudinal cross-section of the combustion chamber 10 according to the invention of the rocket engine of FIG. 1. Given the rotational symmetry of the combustion chamber 10 around the longitudinal axis A, only half of the combustion chamber 10 is illustrated. The water vapor, produced by the combustion of the propellants injected by the injectors 11, is ejected by the neck 15 then the divergent section 20, and therefore circulates from left (upstream) to right (downstream) in FIG. 2, substantially in the direction of the axis A.

The outer face of the wall 30 of the divergent section 20 is cooled by a cooling system 50. For example, this cooling system 50 is a regenerative circuit in which a cryogenic liquid circulates.

A coating 40 is deposited on the inner face 32 of the wall 30 of the divergent section 20. The inner face 42 of the coating 40 is therefore in contact with the water vapor circulating in the combustion chamber 10.

For example, the coating 40 covers the entire inner face 32 of the wall 30 of the divergent section 20, i.e. to the downstream end 25 of the divergent section 20.

On the divergent section 20 of the combustion chamber, the substantially conical geometry of said divergent section 20 makes it so that, from upstream to downstream, a surface swept by the combustion gases is more significant, and this conical geometry also causes an expansion of the combustion gases. The thermal flux along the wall 30 therefore decreases from upstream to downstream, which in general leads to depositing a coating thickness 40 that will increase from the neck 15 toward the downstream end 25 of the divergent section 20 in order to offset the decreased thermal flux.

As shown in FIG. 2, the thickness of the coating 40 increases gradually from upstream to downstream, to the downstream end 25 of the divergent section 20.

Figure 3:
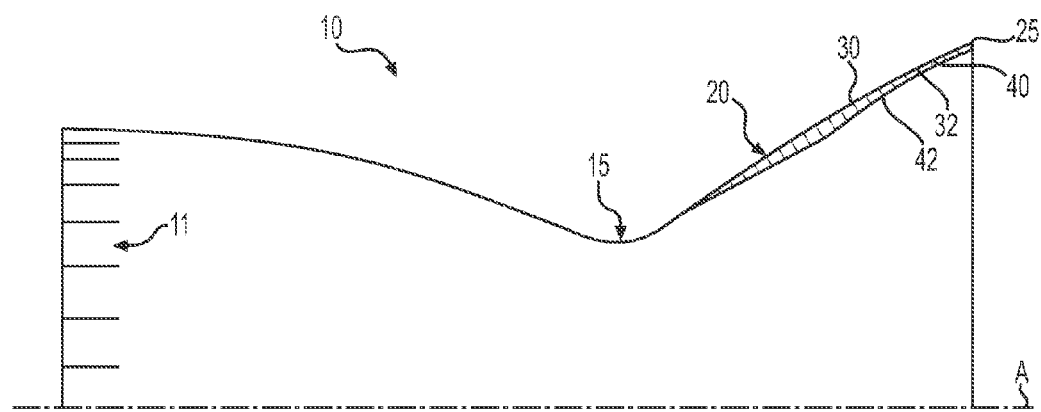

Alternatively, as shown in FIG. 3, the thickness of the coating 40 increases gradually from upstream on an upstream portion of the coating 40, then is substantially constant to the downstream end 25 of the divergent section 20.

Alternatively, the thickness of the coating 40 can increase gradually from the upstream over an upstream portion of the coating 40, then decrease, or vary in another way to the downstream end 25 of the divergent section 20 depending on the geometry of the divergent section 20.

The coating can be made from various materials.

For example, the coating comprises a ceramic.

Thus, in its operating temperature range according to the invention and in the amplitude range of the temperature gradient depending on its thickness, the coating has a better lifetime, during which it preserves its thermal properties and wear resistance. In particular, the coating's propensity for chipping is very low.

For example, the ceramic is a zirconia yttria.

Furthermore, the coating can comprise a sub-layer deposited directly on the inner face of the wall of the divergent section, the ceramic then being deposited on said sub-layer.

Such a sub-layer makes it possible, in a known manner, to improve the catching of the ceramic on the substrate, this substrate being the wall 30 here.

For example, the sub-layer is of the MCrAlY type, where M is a metal.

For example, this metal is nickel, iron, cobalt, or an alloy or mixture of these metals.

The inventor conducted tests with a coating 40 made up of a sub-layer of MCrAlY covered with zirconia, said coating being deposited on the inner wall 32 of a cryogenic-type combustion chamber. These tests revealed that a layer of zirconia with a thickness between 50 microns and 100 microns (thickness corresponding to a thermal conductivity of the zirconia layer equal to 1 W/m·K and 2 W/m·K, depending on the porosity level of said layer) is enough to raise the temperature of the inner face 42 of the coating 40 by about 100 K when this coating is subjected to a thermal flux in the vicinity of 10 MW/m$^2$ (MW=10$^6$ W).

The required zirconia thicknesses are substantially independent of the thermal conductivity of the sub-layer over a range varying between 5 W/m·K (very porous sub-layer) and 15 W/m·K (very dense sub-layer).

In general, a coating 40 whereof the thickness is in the vicinity of 150 microns or greater than 150 microns makes it possible to achieve, on its inner face 42, a high enough temperature to prevent the formation of condensation on that inner face 42 during operation of the rocket engine.

To prevent this condensation from forming, the temperature of the inner face 42 of said coating 40 must be higher than the condensation temperature of the combustion gases on said inner face 42 under the operating conditions of the rocket engine.

For example, the temperature of the inner face 42 of said coating 40 is 50 K higher than this condensation temperature.

This condensation temperature varies with the nature of the combustion gases, and with the pressure in the combustion chamber.

The invention was described above in the case of rocket engine combustion chambers. However, the invention can be applied to any type of combustion chamber including a neck downstream of the injection of the gases, and downstream of said neck, a divergent section whereof the outer face of the wall is, during operation, cooled by a cooling system surrounding the outer face.

What is claimed is:

1. A combustion chamber comprising a neck downstream of the injection of gases, and downstream of the neck a divergent section whereof a radially outer face of an outer wall of the divergent section, when in operation, is cooled by a cooling system using a cryogenic product and surrounding the outer face, wherein the divergent section being such that on an inner face of the outer wall comprises a coating acting as a temperature compensator so that the temperature of the inner face of said coating is higher than the condensation temperature of the combustion gases on the inner face under operating conditions, such that no condensation is formed on the inner face,
wherein the coating is located entirely downstream of the neck, and wherein the thickness of said coating increases gradually over a first, upstream portion of the divergent section and then decreases over a second, downstream pardon of the divergent section.

2. The combustion chamber according to claim 1, wherein said coating comprises a ceramic.

3. The combustion chamber according to claim 2, wherein said ceramic is yttria-stabilized zirconia.

4. The combustion chamber according to claim 2 wherein said coating further comprises a sub-layer deposited directly on the said inner face of said wall of the divergent section, and said ceramic being deposited on this sub-layer.

5. The combustion chamber according to claim 4, wherein said sub-layer is of MCrAlY type, where M is a metal.

6. The combustion chamber according to claim 5, wherein the metal comprises at least one of: nickel, iron and cobalt.

7. The combustion chamber according to claim 1, wherein the thickness of said coating is of the order of 150 microns.

8. The combustion chamber according to claim 1, wherein said coating covers the entire said inner face of said wall of the divergent section.

9. The combustion chamber according to claim 1, wherein said cooling system is a regenerative circuit in which a cryogenic liquid circulates.

10. The combustion chamber according to claim 1, wherein the coating has a thickness between 50 µm and 100 µm.

11. The combustion chamber according to claim 1, wherein the coating has a thermal conductivity between 1 W/m·K and 2 W/m·K.

12. The combustion chamber according to claim 1, wherein the combustion chamber is embodied in a rocket engine.

13. The combustion chamber according to claim 1, wherein the combustion chamber is rotationally symmetrical.

* * * * *